US012362086B2

(12) United States Patent
Shiokawa et al.

(10) Patent No.: US 12,362,086 B2
(45) Date of Patent: Jul. 15, 2025

(54) COIL COMPONENT

(71) Applicant: Murata Manufacturing Co., Ltd., Kyoto-fu (JP)

(72) Inventors: Noboru Shiokawa, Nagaokakyo (JP); Keiichirou Hayashi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 793 days.

(21) Appl. No.: 17/695,762

(22) Filed: Mar. 15, 2022

(65) Prior Publication Data

US 2022/0344090 A1 Oct. 27, 2022

(30) Foreign Application Priority Data

Apr. 24, 2021 (JP) ................................ 2021-073700

(51) Int. Cl.

*H01F 27/02* (2006.01)
*H01F 17/04* (2006.01)
*H01F 27/30* (2006.01)

(52) U.S. Cl.

CPC ........... *H01F 27/02* (2013.01); *H01F 27/306* (2013.01)

(58) Field of Classification Search

CPC ....... H01F 27/02; H01F 27/306; H01F 17/045
See application file for complete search history.

(56) References Cited

U.S. PATENT DOCUMENTS

2009/0002117 A1* 1/2009 Kawarai ............. H01F 17/0006 336/233
2011/0203105 A1* 8/2011 Ishido ................... H01F 17/045 29/605
2017/0169927 A1* 6/2017 Miyamoto .............. H01F 27/32
2018/0286555 A1* 10/2018 Aoki ................... H01F 27/2828
2019/0237233 A1* 8/2019 Tanaka .................... H01F 27/24

FOREIGN PATENT DOCUMENTS

JP 2008-010675 A 1/2008
JP 2011171544 A * 9/2011

* cited by examiner

*Primary Examiner* — Malcolm Barnes
(74) *Attorney, Agent, or Firm* — Studebaker Brackett PLLC

(57) ABSTRACT

A coil component includes a cover member containing an ultraviolet curable resin and a filler made of flat particles each having a major axis and a minor axis. The filler preferably contains talc particles. The particles of the filler contained in a portion of the cover member that covers a top surface of the flange are aligned to orient the major axes parallel or substantially parallel to the top surface. The filler contained in the portion of the cover member that covers the top surface has an area ratio of from 15.0% to 50.1% in a section of the cover member taken along a plane that passes through the central axis of a winding core portion and orthogonally intersects the top surface. The grain size of the particles of the filler in D50 is from 1 μm to 30 μm.

20 Claims, 4 Drawing Sheets

COIL COMPONENT

CROSS-REFERENCE TO RELATED APPLICATION

This application claims benefit of priority to Japanese Patent Application No. 2021-073700 filed Apr. 24, 2021, the entire content of which is incorporated herein by reference.

BACKGROUND

Technical Field

The present disclosure relates to a coil component, and in particular, relates to a coil component that includes a core and a cover member, the core having a winding core portion around which a wire is wound and also having a first flange and a second flange formed at respective ends of the winding core portion, the cover member being formed so as to cover the core from a top surface of the first flange to a top surface of the second flange.

Background Art

For example, Japanese Unexamined Patent Application Publication No. 2008-10675 discloses a coil component that includes a core having a winding core portion around which a wire is wound and also having a first flange and a second flange formed respectively at a first end and a second end of the winding core portion that are positioned oppositely in the axial direction thereof. The coil component also includes a cover member (or an "exterior resin portion" as termed in Japanese Unexamined Patent Application Publication No. 2008-10675) that is disposed so as to cover the core from a top surface of the first flange to a top surface of the second flange.

The cover member is provided to protect the wire from the outside environment and also to serve as a flat adsorption surface to be used for a vacuum chuck to pick up the coil component in the step of installing the coil component onto a circuit board at a predetermined position.

According to Japanese Unexamined Patent Application Publication No. 2008-10675, the cover member is made, for example, of an epoxy-based thermosetting resin or of a curable resin, such as an ultraviolet curable resin.

In most cases, known coil components are designed for use in general consumer appliances. In other words, known coil components are not necessarily designed to be used in conditions requiring higher reliability, for example, for devices for vehicle.

For example, the cover member, which is made of a resin, is subjected to a large compressive stress in thermal shock testing conducted to satisfy requirements of high-reliability devices for vehicle or the like. In this case, cracks are sometimes generated in a portion of the cover member that covers the wire wound around the winding core portion.

SUMMARY

Accordingly, the present disclosure provides a coil component including a cover member in which cracks as described above do not occur easily.

The cracks described above were found to be prevented from occurring easily when the thickness of the portion of the cover member over each flange was increased. It was also found, however, that the thickness of the portion of the cover member over the flange tended to vary for individual coil components, and accordingly the thickness of the portion over the flange was not sufficient in some coil components.

The present disclosure is made on the basis of the above findings. According to an aspect of the present disclosure, a coil component includes a core having a winding core portion extending in an axial direction and also having a first flange and a second flange formed respectively at a first end and a second end of the winding core portion. The first end and the second end are positioned at opposite ends of the winding core portion in the axial direction. The first flange and the second flange have respective inside surfaces defining the first end and the second end of the winding core portion and respective outside surfaces facing in opposite directions from corresponding inside surfaces. In addition, the first flange and the second flange have respective bottom surfaces extending between corresponding inside surfaces and corresponding outside surfaces and facing toward a mounting surface and also have respective top surfaces facing in opposite directions from corresponding bottom surfaces. Moreover, the first flange and the second flange have respective first side surfaces and respective second side surfaces that are facing in opposite directions and are adjoining the corresponding bottom surfaces, the corresponding top surfaces, the corresponding inside surfaces, and the corresponding outside surfaces.

The coil component further includes at least one first terminal electrode formed at the bottom surface of the first flange, at least one second terminal electrode formed at the bottom surface of the second flange, at least one wire wound around the winding core portion and connecting the first terminal electrode to the second terminal electrode, and a cover member disposed so as to cover the core from the top surface of the first flange to the top surface of the second flange.

Also, the cover member includes an ultraviolet curable resin and a filler made of flat particles each having a major axis and a minor axis.

According to the present disclosure, the filler contained in the cover member acts so as to provide the cover member with a predetermined thickness. As a result, a sufficient thicknesses of the portions of the cover member over the top surfaces of the first and second flanges can be provided.

Since the cover member having a sufficient thickness is formed over the top surfaces of the first and second flanges, the likelihood of crack generation can be reduced in the portion of the cover member that covers the wire wound around the winding core portion even if the cover member is subjected to a large compressive stress in the thermal shock testing. The reason behind this is probably that an increase in the volume of the portions of the cover member over the top surfaces of the first and second flanges reduces the likelihood of the stress occurring at the interface between each flange and the cover member.

Moreover, according to the present disclosure, the filler in the cover member contains flat particles. The particles of the filler tend to be aligned so as to orient their major axes parallel or substantially parallel to the top surface of each flange. Accordingly, the filler tends to act so as to reduce the contraction of the cover member along the top surface of each flange.

In addition, the cover member is made of an ultraviolet curable resin, which can improve work efficiency in the curing step.

DETAILED DESCRIPTION

Figure 1A:
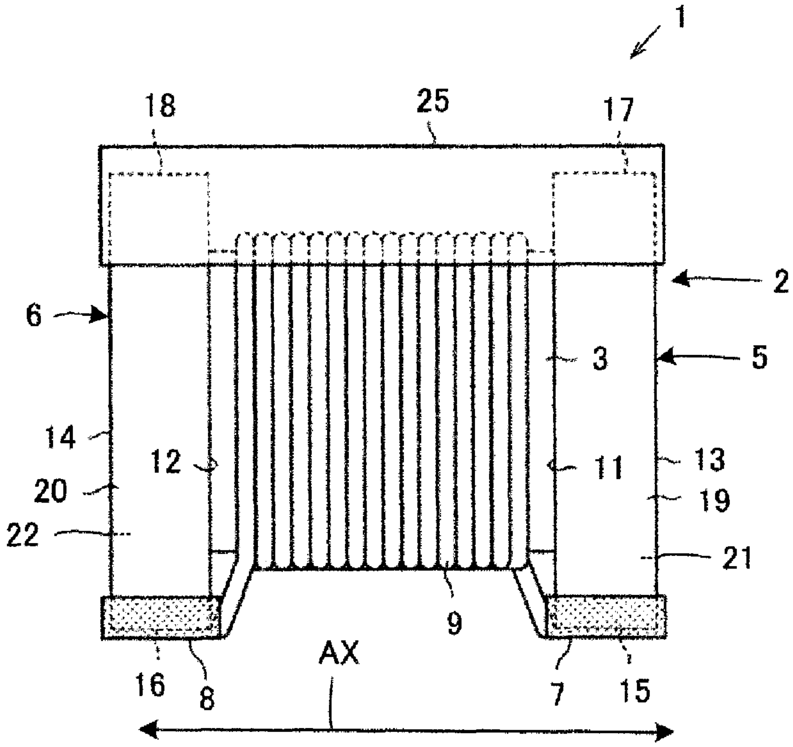
FIG. 1A is a front view of a coil component according to a first embodiment of the present disclosure.

A coil component 1 according to a first embodiment of the present disclosure will be described with reference to FIGS. 1A and 1B.

The coil component 1 includes a core 2. The core 2 has a winding core portion 3, a first flange 5, and a second flange 6. The winding core portion 3 extends in the axial direction AX. The first flange 5 and the second flange 6 are formed respectively at first and second ends of the winding core portion 3 that are positioned oppositely in the axial direction. The core 2 is shaped like a quadrangular prism as a whole. For example, a dimension of the core 2 in the axial direction AX is 0.5 to 2.6 mm, a height dimension thereof is 0.4 to 2.0 mm, and a width dimension is 0.3 to 2.3 mm. An example of the core 2 has a length of 1.6 mm in the axial direction AX, a height of 0.85 mm, and a width of 0.8 mm.

For example, the core 2 is made of a nonmagnetic material such as a ceramic insulator like alumina, a magnetic material like a nickel-zinc (Ni—Zn) based ferrite or a manganese-zinc (Mn—Zn) based ferrite, and a magnetic metal. The core 2 is obtained by compression-molding the powders of the above materials and by sintering the compression-molded product. Alternatively, the core 2 may be formed by molding a resin containing a magnetic powder.

The first flange 5 has a bottom surface 15 that faces a mounting surface, and a first terminal electrode 7 is formed on the bottom surface 15. The second flange 6 has a bottom surface 16 that faces a mounting surface, and a second terminal electrode 8 is formed on the bottom surface 16.

The terminal electrodes 7 and 8 are formed, for example, by baking an electroconductive paste containing a glass powder and silver as a conductive component, and the surfaces of the terminal electrodes 7 and 8 are plated, for example, with Ni, Cu, or Sn. Alternatively, the terminal electrodes 7 and 8 may be formed by adhering separately prepared metallic terminal members to the flanges 5 and 6.

A wire 9 is wound around the winding core portion 3. The wire 9 is formed of a core wire and a covering material for covering the core wire, which are not illustrated. The core wire is made of a conductive metal, such as Cu or Ag. For example, the covering material is an electrically insulating resin, such as polyurethane, polyester, polyimide, polyamide, or a mixture thereof. The diameter of the wire 9 including the core wire and the covering material is preferably 16 μm or more and 110 μm or less (i.e., from 16 μm to 110 μm).

One end of the wire 9 is coupled to the first terminal electrode 7, and the other end of the wire 9 is coupled to the second terminal electrode 8. The wire 9 is coupled to the terminal electrodes 7 and 8 preferably by thermocompression bonding. Alternatively, soldering and welding may be used in place of the thermocompression bonding.

The first flange 5 has an inside surface 11, an outside surface 13, the bottom surface 15, a top surface 17, a first side surface 19, and a second side surface 21. The inside surface 11 defines the first end of the winding core portion 3, and the outside surface 13 faces in the opposite direction from the inside surface 11. The bottom surface 15 extends between the inside surface 11 and the outside surface 13 and faces toward a mounting surface. The top surface 17 extends between the inside surface 11 and the outside surface 13 and faces in the opposite direction from the bottom surface 15. The first side surface 19 and the second side surface 21 face in the opposite directions and adjoin the bottom surface 15, the top surface 17, the inside surface 11, and the outside surface 13.

The second flange 6 has an inside surface 12, an outside surface 14, the bottom surface 16, a top surface 18, a first side surface 20, and a second side surface 22. The inside surface 12 defines the second end of the winding core portion 3, and the outside surface 14 faces in the opposite direction from the inside surface 12. The bottom surface 16 extends between the inside surface 12 and the outside surface 14 and faces toward a mounting surface. The top surface 18 extends between the inside surface 12 and the outside surface 14 and faces in the opposite direction from the bottom surface 16. The first side surface 20 and the second side surface 22 face in the opposite directions and adjoin the bottom surface 16, the top surface 18, the inside surface 12, and the outside surface 14.

The coil component 1 also includes a cover member 25. The cover member 25 is disposed so as to cover the core 2 from the top surface 17 of the first flange 5 to the top surface 18 of the second flange 6. It is preferable that the cover member 25 not only cover the top surfaces 17 and 18 but also cover portions of the inside surfaces 11 and 12, the outside surfaces 13 and 14, the first side surfaces 19 and 20, and the second side surfaces 21 and 22. These portions adjoin the top surfaces 17 and 18. For example, the cover member 25 contains an ultraviolet curable resin based on an epoxy, acrylic, urethane, or silicone resin and also contains a filler made of flat particles.

Figure 1B:
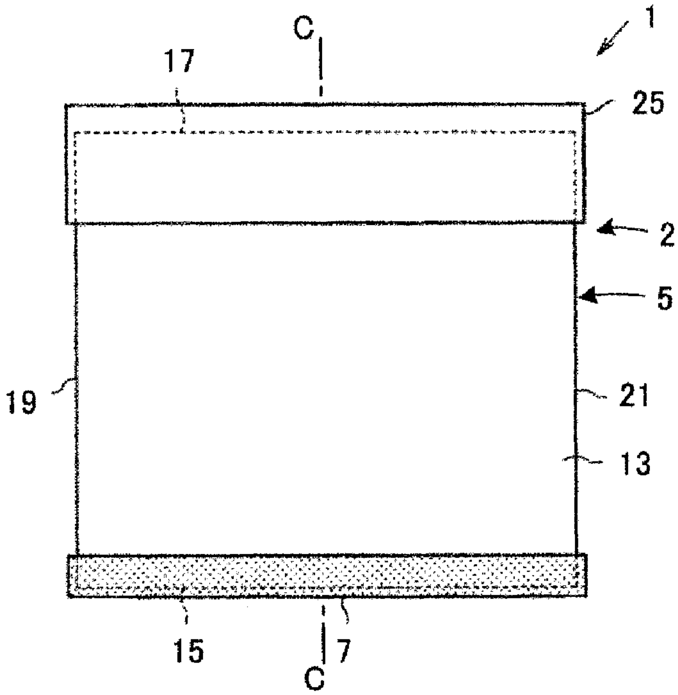
FIG. 1B is a right side view of the coil component.
Figure 2:
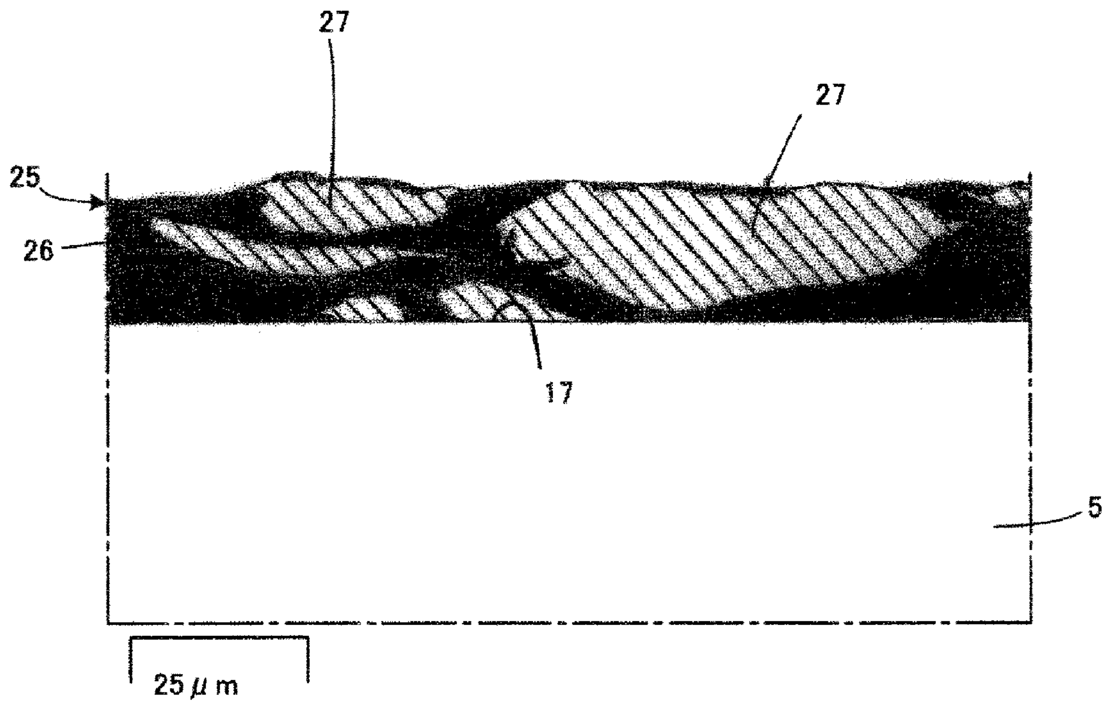
FIG. 2 is a view prepared by tracing an electron beam image that images a section of a cover member of an example product corresponding to the coil component of FIG. 1, the section being taken along a plane passing through the central axis of a winding core portion and orthogonally intersecting a top surface of a flange.

FIG. 2 is a view prepared by tracing an electron beam image that images a section of the cover member 25 formed on the top surface 17 of the first flange 5 of the core 2 in an example product corresponding to the coil component 1 of FIG. 1. As illustrated in FIG. 2, the cover member 25 contains an ultraviolet curable resin 26 and a filler 27.

As illustrated in FIG. 2, the filler 27 is made of flat particles each of which has a major axis extending in a longitudinal direction in which the particle has a longest dimension and a minor axis orthogonal to the major axis. Here, the minor axis is the shortest one among directions orthogonal to the major axis. The term "flat particle" is such a particle that the aspect ratio of the longest diameter "a" to the shortest diameter "b" (a/b) is 2.0 or more and 30 or less (i.e., from 2.0 to 30) on the average. For example, in the section illustrated in FIG. 2, the aspect ratio can be obtained by averaging measured results of at least ten particles of the filler 27 under a scanning electron microscope or an SEM (SUI510), at 320 magnifications. For example, the flat particle may be a needle like particle (having a longer dimension along the X-axis and shorter dimensions along the Y-axis and the Z-axis) or a tabular particle (having longer dimensions along the X-axis and the Y-axis and a shorter dimension along the Z-axis). The filler 27 may be made of inorganic particles, such as talc particles, silica particles, or zirconia particles, among which the talc particles are preferable.

Talc is a material derived from magnesium-based silicate minerals with $Mg_3Si_4O_{10}(OH)_2$ as a main ingredient. The talc particles are obtained by grinding the above silicate minerals. When the silicate minerals are ground, the talc particles normally become flat particles. Moreover, the talc particles exhibit good bonding characteristics with the ultraviolet curable resin 26 because of minute irregularities on the surface of each particle. The talc particles obtained by grinding the silicate minerals may contain impurities.

Next, a step of forming a cover member 25 will be described with reference to FIG. 3. FIG. 2 will be referred to again after the step of forming the cover member 25 is described.

Figure 3A:
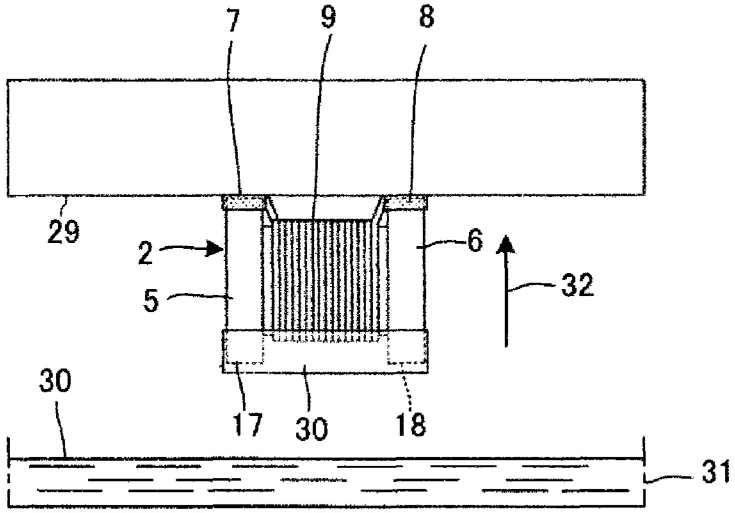
FIG. 3A and FIG. 3B are front views illustrating a step of forming the cover member in a method of manufacturing the coil component of FIG. 1.

FIG. 3A illustrates a state in which the coil component 1 already has a member that becomes the cover member 25 later (i.e., uncured liquid resin 30). In FIG. 3A, the core 2 is in a state after the wire 9 is wound around and before the cover member 25 is formed. The core 2 is adhered to, and held by, an adhesive sheet 29 with the terminal electrodes 7 and 8 facing toward the adhesive sheet 29. Meanwhile, a resin bath 31 that stores uncured liquid resin 30 to a predetermined depth is prepared. The uncured liquid resin 30 contains uncured ultraviolet curable resin 26 and the filler 27, which will become the cover member 25 later.

Next, a portion of the core 2 opposite to the terminal electrodes 7 and 8 is immersed in the resin bath 31 and subsequently taken out of the resin bath 31 in the direction indicated by arrow 32. FIG. 3A illustrates the core 2 in this state. As illustrated in FIG. 3A, the uncured liquid resin 30 in the resin bath 31 is smeared on the portion of the core 2 opposite to the terminal electrodes 7 and 8. The uncured liquid resin 30 covers the core 2 from the top surface 17 of the first flange 5 to the top surface 18 of the second flange 6.

Figure 3B:
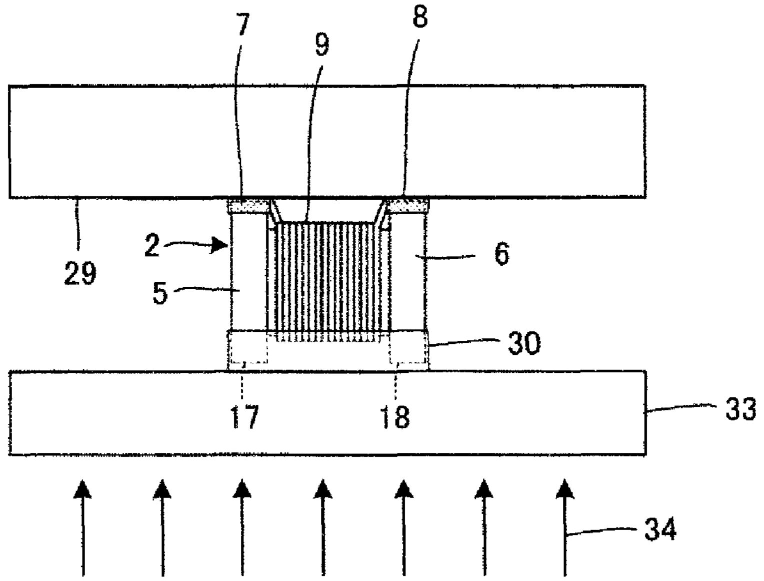

Next, as illustrated in FIG. 3B, the portion of the core 2 to which the uncured liquid resin 30 is applied, in other words, the top surfaces 17 and 18 of the flanges 5 and 6, are pressed onto a contact sheet 33 with the core 2 being held by the adhesive sheet 29. In this state, each particle of the filler 27 in the uncured liquid resin 30 tends to behave so as to align its major axis parallel or substantially parallel to the top surfaces 17 and 18.

The top surfaces 17 and 18 of the flanges 5 and 6 need not be flat entirely. For example, in the case of the core 2 being subjected to barrel finishing, the edges of the top surfaces 17 and 18 are rounded. In this case, the top surfaces 17 and 18 should be interpreted as the surfaces parallel to the axial direction AX of the winding core portion 3. Accordingly, the "top surfaces 17 and 18" as used in the above sentence "each particle of the filler 27 tends to behave so as to align the major axis parallel or substantially parallel to the top surfaces 17 and 18" are to be interpreted as the surfaces parallel to the axial direction AX.

In the case of the talc particles being used for the filler 27, the talc particles are flat and more fragile compared with other materials. The talc particles are advantageous in that the surface of the cover member 25 can be flattened easily when pressed against the contact sheet 33. Another advantage is that the filler 27 made of the talc particles does not damage the core 2 easily.

The contact sheet 33 is preferably transparent so that ultraviolet light can pass through. Accordingly, the contact sheet 33 is made, for example, of polyethylene terephthalate.

Next, the uncured liquid resin 30 is irradiated with ultraviolet light 34 through the contact sheet 33 while the contact sheet 33 is pressed against the portion of the core 2 to which the uncured liquid resin 30 is applied as described above. The ultraviolet curable resin 26 contained in the uncured liquid resin 30 is cured, thereby forming the cover member 25 containing the ultraviolet curable resin 26 and the filler 27 as illustrated FIG. 2.

Using the ultraviolet curable resin in the cover member 25 improves productivity. On the other hand, using the filler in the ultraviolet curable resin has been hitherto avoided because of the filler blocking ultraviolet light. In the present embodiment, however, the filler 27 contained in the cover member 25 serves to ensure the thickness of the cover member 25 on the top surfaces 17 and 18 of the flanges 5 and 6, which provides an effect of reducing crack generation. Regarding ultraviolet light blockage, it has been confirmed that a predetermined amount of the filler 27 mixed in the ultraviolet curable resin 26 does not prevent ultraviolet light from curing the ultraviolet curable resin 26.

As described above, when the core 2 is pressed against the contact sheet 33, many particles of the filler 27 contained in the portions of the cover member 25 that cover the top surfaces 17 and 18 of the flanges 5 and 6 are aligned so as to orient the major axes of the particles parallel or substantially parallel to the top surface 17 as illustrated in FIG. 2. The filler 27 thereby provides an effect of reducing the contraction of the cover member 25 along the top surfaces 17 and 18 of the flanges 5 and 6.

On the other hand, a portion of the cover member 25 that covers the winding core portion 3 is not directly subjected to the pressure from the contact sheet 33. The filler 27 contained in the portion of the cover member 25 is such that the major axes of the particles tend to be oriented randomly.

The grain size (D50) of the particles of the filler 27 contained in the cover member 25 is preferably 1 μm or more and 30 μm or less (i.e., from 1 μm to 30 μm), and more preferably, 5 μm or more and 30 μm or less. When the grain size of the filler 27 stays within the above range, the filler 27 reduces stress in the cover member 25 and reliably provides an effect of reducing crack generation at thermal shocks. In addition, due to the grain size (D50) of the particles of the filler 27 being 30 μm or less, an unnecessary increase in the size of the product can be avoided. Note that the grain size of the particles of the filler 27 can be measured using the light scattering method. The grain size of the particles of the filler 27 before forming the cover member 25 is generally maintained after the cover member 25 is formed. This has been confirmed by determining the grain size of the particles of the filler 27 through averaging measured results of at least ten particles of the filler 27, for example, using the SEM (SUI510) at 320 magnifications.

It is preferable that some of the particles of the filler 27 be in contact with the top surfaces 17 and 18 as illustrated in FIG. 2. It is also preferable that some of the particles of the filler 27 be exposed at the surfaces of the portions of the cover member 25 that cover the top surfaces 17 and 18. With this configuration, the heat of the core 2 can be dissipated effectively to the outside.

The content of the filler 27 in the cover member 25 is preferably such that the filler 27 contained in the portions of the cover member 25 that cover the top surfaces 17 and 18 have an area ratio of 15.0% or more and 50.1% or less (i.e., from 15.0% to 50.1%) in the section of the cover member 25 taken along plane C-C (see FIG. 1B that passes through the central axis of the winding core portion 3 and orthogonally intersects the top surfaces 17 and 18. In other words, in the section of the cover member 25 as illustrated in FIG. 2, the area ratio is defined as a ratio of the cross-sectional area of the particles of the filler 27 to the cross-sectional area of the portions of the cover member 25 that cover the top surfaces 17 and 18, and the area ratio of the filler 27 is preferably 15.0% or more and the 50.1% or less (i.e., from 15.0% to 50.1%). Such an area ratio can be achieved by controlling the force of pressing the core 2 against the above contact sheet 33.

When the filler 27 contained in the portions of the cover member 25 that cover the top surfaces 17 and 18 has an area ratio of 15.0% or more as described above, the uncured liquid resin 30 can have a favorable viscosity/rheology in handling the uncured liquid resin 30 in the application step described with reference to FIG. 3A. In addition, this can reduce the compressive stress in the cover member 25 during reliability testing and reliably provides an effect of suppressing growth of micro-cracks. Moreover, this can reduce the variation of thickness, and reliably maintain a predetermined thickness, of the portions of the cover member 25 that cover the top surfaces 17 and 18.

When the filler 27 contained in the portions of the cover member 25 that cover the top surfaces 17 and 18 has an area ratio of 50.1% or less, the ultraviolet curable resin 26 can be favorably cured with a relatively small cumulative amount of light. In addition, the uncured liquid resin 30 can have a favorable viscosity/rheology in handling the uncured liquid resin 30 in the application step described with reference to FIG. 3A.

It is preferable that the area ratio of the filler 27 contained in the portions of the cover member 25 that cover the top surfaces 17 and 18 be greater than the area ratio of the filler 27 contained in the portion of that cover member 25 that covers the winding core portion 3 in the section of the cover member 25 taken along plane C-C that passes through the central axis of the winding core portion 3 and orthogonally intersects the top surfaces 17 and 18. The above-described relationship of the area ratios is brought about due to the fact that the portions of the cover member 25 that cover the top surfaces 17 and 18 are directly pressed against the contact sheet 33 while the portion of the cover member 25 that covers the winding core portion 3 is not directly pressed against the contact sheet 33.

As described above, the area ratio of the filler 27 contained in the portions covering the top surfaces 17 and 18 is greater than the area ratio of the filler 27 contained in the portion covering the winding core portion 3. Put another way, the area ratio of the filler 27 contained in the portion covering the winding core portion 3 is smaller than the area ratio of the filler 27 contained in the portions covering the top surfaces 17 and 18. Accordingly, the portion of the cover member 25 covering the winding core portion 3 can transmit ultraviolet light easily even though the thickness of the cover member 25 is greater, which can reliably cure the ultraviolet curable resin 26 in the portion covering the winding core portion 3.

Specimens were prepared and evaluated in terms of thickness variation of the cover member 25, presence of cracks, and application properties of the uncured liquid resin 30. The specimens had different area ratios of the filler 27 contained in the portions of the cover member 25 that cover the top surfaces 17 and 18. The results are summarized in Table 1 below.

TABLE 1

| Specimen | Area Ratio of Filler | Thickness Variation of Cover Member | Presence of Cracks | Application Properties |
|---|---|---|---|---|
| 1 | 12.2% | Fair | Not Present | Good |
| 2 | 15.0% | Good | Not Present | Good |
| 3 | 22.0% | Good | Not Present | Good |
| 4 | 23.2% | Good | Not Present | Good |
| 5 | 24.9% | Good | Not Present | Good |
| 6 | 34.2% | Good | Not Present | Good |
| 7 | 34.5% | Good | Not Present | Good |
| 8 | 41.2% | Good | Not Present | Good |
| 9 | 50.1% | Good | Not Present | Good |
| 10 | 52.0% | Good | Not Present | Fair |

In Table 1, the "area ratio of filler" was obtained using the SEM (SUI510) at 320 magnifications with an accelerating voltage of 15 kV and a probe current of 60 mA.

A section of each specimen was observed using a microscope capable of measuring length, and the "thickness variation of cover member" was evaluated as "good" or "fair".

For the "presence of cracks", the specimens were subjected to the thermal shock testing (500 cycles of −155° C. to +125° C. each), and subsequently the surface of the cover member of each specimen was observed to determine whether cracks were present.

For the "application properties", the uncured liquid resin applied onto each specimen was observed to determine whether the amount of the resin was appropriate. The results were evaluated as "good" or "fair". When the amount of the filler increases in the uncured liquid resin, the viscosity of the uncured liquid resin also increases. As a result, an excess amount of the uncured liquid resin remains on the core when the core is taken out of the resin bath.

As shown in Table 1, Specimens 2 to 9, of which the "area ratio of filler" is 15.0% or more and 50.1% or less (i.e., from 15.0% to 50.1%), provided favorable results for the "thickness variation of cover member", the "presence of cracks", and the "application properties".

On the other hand, Specimen 1, of which the "Area Ratio of Filler" is less than 15.0%, was evaluated as "fair" for the "thickness variation of cover member". Specimen 10, of which the "area ratio of filler" exceeds 50.1%, resulted in "fair" for the "application properties".

Figure 4:
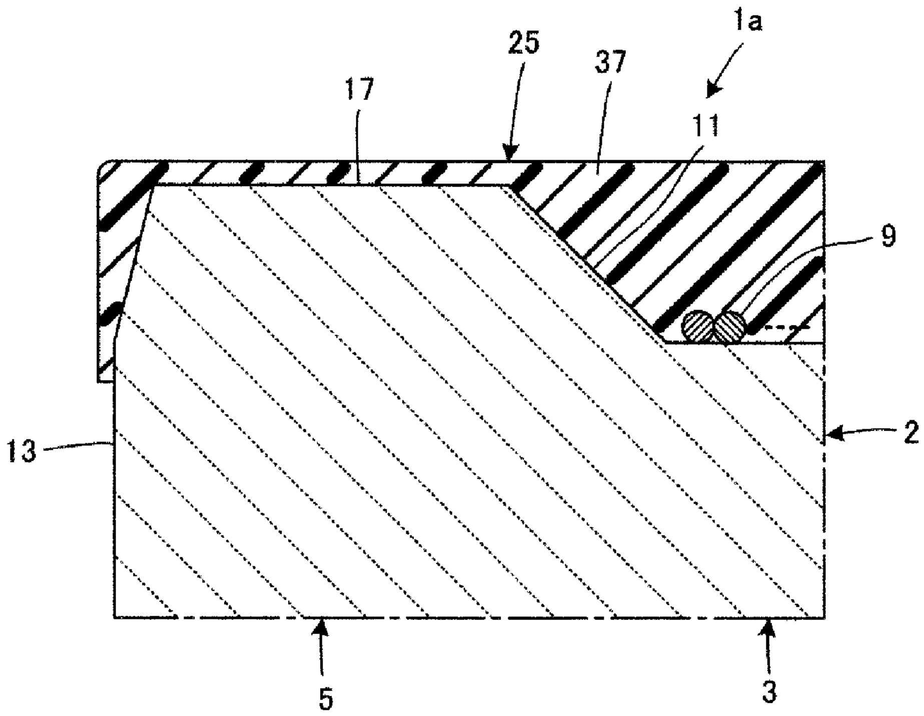
FIG. 4 is a cross-sectional view illustrating a portion of a coil component according to a second embodiment of the present disclosure, in which the cover member is formed so as to cover the top surface of the flange.

FIG. 4 is a cross-sectional view illustrating a portion of a coil component 1*a* according to a second embodiment of the present disclosure, in which the cover member 25 is formed so as to cover the top surface 17 of the flange 5. In FIG. 4, the elements corresponding to those illustrated in FIGS. 1A and 1B are denoted by the same reference signs, thereby omitting duplicated description.

The coil component 1*a* illustrated in FIG. 4 is characterized in that the inside surface 11 of the flange 5 of the core 2 inclines. The cover member 25 has a thick portion 37 over the inside surface 11 of the flange 5 located near the winding core portion 3. In the coil component 1*a*, stress is not concentrated easily in a portion of the cover member 25 at the border between the flange 5 and the winding core portion 3 compared with the coil component 1 of the first embodiment, which can reduce the likelihood of crack generation.

The present disclosure has been described in relation to embodiments illustrated in the drawings. The embodiments illustrated are examples and subjected to various modifications within the scope of the present disclosure.

For example, the coil component is not limited to the one serving as a single coil but may be the one formed of multiple coils, such as a pulse transformer or a common mode choke coil. The coil component may have an arbitrary number of wires and accordingly an arbitrary number of terminal electrodes formed at each flange.

What is claimed is:

1. A coil component comprising:
a core having
a winding core portion extending in an axial direction, and
a first flange and a second flange configured respectively at a first end and a second end of the winding core portion, the first end and the second end being positioned at opposite ends of the winding core portion in the axial direction,
the first flange and the second flange having
respective inside surfaces defining the first end and the second end of the winding core portion,
respective outside surfaces facing in opposite directions from corresponding inside surfaces,
respective bottom surfaces extending between corresponding inside surfaces and corresponding outside surfaces and facing toward a mounting surface,
respective top surfaces facing in opposite directions from corresponding bottom surfaces, and
respective first side surfaces and respective second side surfaces facing in opposite directions and adjoining the corresponding bottom surfaces, the corresponding top surfaces, the corresponding inside surfaces, and the corresponding outside surfaces;
at least one first terminal electrode at the bottom surface of the first flange;
at least one second terminal electrode at the bottom surface of the second flange;
at least one wire wound around the winding core portion and connecting the first terminal electrode to the second terminal electrode; and
a cover member disposed to cover the core from the top surface of the first flange to the top surface of the second flange, wherein
the cover member includes an ultraviolet curable resin and a filler made of flat particles each having a major axis and a minor axis.

2. The coil component according to claim 1, wherein
the filler contains talc particles.

3. The coil component according to claim 2, wherein
the filler contained in portions of the cover member that cover the top surfaces includes some particles of which the major axes are aligned parallel or substantially parallel to the top surfaces.

4. The coil component according to claim 2, wherein
the filler contained in a portion of the cover member that covers the winding core portion has particles of which the major axes are oriented randomly.

5. The coil component according to claim 2, wherein
the filler contained in the portions of the cover member that cover the top surfaces has an area ratio of from 15.0% to 50.1% in a section of the cover member taken along a plane that passes through the axis of the winding core portion and orthogonally intersects the top surfaces.

6. The coil component according to claim 2, wherein
the area ratio of the filler contained in the portions of the cover member that cover the top surfaces is greater than an area ratio of the filler contained in the portion of the cover member that covers the winding core portion in the section of the cover member taken along the plane that passes through the axis of the winding core portion and orthogonally intersects the top surfaces.

7. The coil component according to claim 2, wherein
a grain size of the particles of the filler in D50 is from 1 μm to 30 μm.

8. The coil component according to claim 2, wherein
some particles of the filler are in contact with the top surfaces.

9. The coil component according to claim 2, wherein
some particles of the filler are exposed at surfaces of the portions of the cover member covering the top surfaces.

10. The coil component according to claim 1, wherein
the filler contained in portions of the cover member that cover the top surfaces includes some particles of which the major axes are aligned parallel or substantially parallel to the top surfaces.

11. The coil component according to claim 10, wherein
the filler contained in a portion of the cover member that covers the winding core portion has particles of which the major axes are oriented randomly.

12. The coil component according to claim 10, wherein
the filler contained in the portions of the cover member that cover the top surfaces has an area ratio of from 15.0% to 50.1% in a section of the cover member taken along a plane that passes through the axis of the winding core portion and orthogonally intersects the top surfaces.

13. The coil component according to claim 10, wherein
the area ratio of the filler contained in the portions of the cover member that cover the top surfaces is greater than an area ratio of the filler contained in the portion of the cover member that covers the winding core portion in the section of the cover member taken along the plane that passes through the axis of the winding core portion and orthogonally intersects the top surfaces.

14. The coil component according to claim 1, wherein
the filler contained in a portion of the cover member that covers the winding core portion has particles of which the major axes are oriented randomly.

15. The coil component according to claim 14, wherein
the filler contained in the portions of the cover member that cover the top surfaces has an area ratio of from 15.0% to 50.1% in a section of the cover member taken along a plane that passes through the axis of the winding core portion and orthogonally intersects the top surfaces.

16. The coil component according to claim 1, wherein
the filler contained in the portions of the cover member that cover the top surfaces has an area ratio of from 15.0% to 50.1% in a section of the cover member taken along a plane that passes through the axis of the winding core portion and orthogonally intersects the top surfaces.

17. The coil component according to claim 1, wherein
the area ratio of the filler contained in the portions of the cover member that cover the top surfaces is greater than an area ratio of the filler contained in the portion of the cover member that covers the winding core portion in the section of the cover member taken along the plane that passes through the axis of the winding core portion and orthogonally intersects the top surfaces.

18. The coil component according to claim 1, wherein
a grain size of the particles of the filler in D50 is from 1 μm to 30 μm.

19. The coil component according to claim 1, wherein
some particles of the filler are in contact with the top surfaces.

20. The coil component according to claim 1, wherein some particles of the filler are exposed at surfaces of the portions of the cover member covering the top surfaces.

* * * * *